United States Patent [19]

Negishi

[11] Patent Number: 4,657,355
[45] Date of Patent: Apr. 14, 1987

[54] DEVICE FOR CHANGING LIGHT WIDTH AND DIRECTION

[76] Inventor: Masataka Negishi, 1000, Oaza Ryoke, Urawa-Shi, Saitama-Ken, Japan

[21] Appl. No.: 463,443
[22] PCT Filed: May 25, 1982
[86] PCT No.: PCT/JP82/00191
 § 371 Date: Jan. 19, 1983
 § 102(e) Date: Jan. 19, 1983
[87] PCT Pub. No.: WO82/04326
 PCT Pub. Date: Dec. 9, 1982

[30] Foreign Application Priority Data
 May 25, 1981 [JP] Japan .................. 56-78149
 Oct. 21, 1981 [JP] Japan .................. 56-168042

[51] Int. Cl.⁴ .................. G02B 3/08; G02B 5/04
[52] U.S. Cl. .................. 350/452
[58] Field of Search .................. 350/452

[56] References Cited
U.S. PATENT DOCUMENTS
 4,185,895 1/1980 Stephans et al. .................. 350/452

FOREIGN PATENT DOCUMENTS
 0050951 5/1974 Japan .
 0151032 11/1977 Japan .
 0106250 8/1979 Japan .

Primary Examiner—John K. Corbin
Assistant Examiner—Rebecca D. Gass
Attorney, Agent, or Firm—Wenderoth, Lind & Ponack

[57] ABSTRACT

A transparent Fresnel plate having an outer face on which a large number of prisms having the form of minute ridges having sloped faces are disposed in parallel arrangement is used for changing the width and direction of light. Of sunlight projected onto the face where the ridges exist, light reflected by the sloped faces of the ridges becomes small in width and, at the same time, advances in a direction deviating from the direction of the projected light. In the path of this reflected light, a reflecting device for reflecting the same again toward a specific position or a device for collecting the energy of the reflected light is provided. The Fresnel plate, furthermore, can be used for receiving sunlight and introducing it into the interior of a house. In this case, sunlight rays of narrow width can be changed in light rays of broad width. The Fresnel plate can be used also as a blind or as a reflecting mirror for special uses.

2 Claims, 29 Drawing Figures

DEVICE FOR CHANGING LIGHT WIDTH AND DIRECTION

TECHNICAL FIELD

This invention relates to a device capable of simultaneously changing the width and direction principally of parallel light rays.

BACKGROUND ART

As means for changing the direction of light, there are reflecting mirrors. With a reflecting mirror, by the reflection at its surface of light, the direction changes, but, in the case of a planar reflecting mirror, the width of a light beam projected as incident light thereonto and the width of the reflected light beam are the same, and changing of width is not carried out. In a curved-surface reflecting mirror, although parallel light can be converted into convergent light or divergent light, a parallel light beam cannot be converted into a parallel light beam of different width. In order to convert a parallel light beam into a parallel light beam of different width, heretofore, there has been no way except to use a lens system, but a lens system is expensive, and, moreover, there is a limit in practical use to the width of the light beam which can be processed.

In view of the above facts, this invention has the object of obtaining a device for changing light width and direction which is capable of changing the direction of a light beam as it changes the width with any desired ratio, without any special restriction of the width of the light beam to be processed, and which can be produced by quantity production at a relatively low price.

DISCLOSURE OF THE INVENTION

According to this invention, the above stated object is achieved by a light width and direction changing device comprising a Fresnel plate having a surface constituted by providing in parallel arrangement countless minute ridges (each) having at least one sloped face.

BEST MODES FOR CARRYING OUT THE INVENTION

Figure 1:
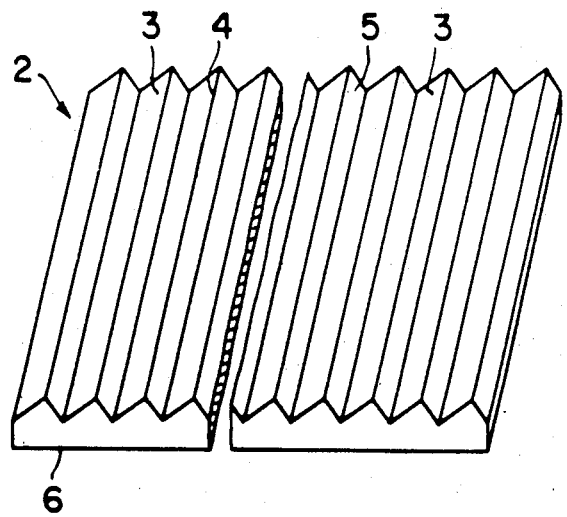
FIG. 1 is a perspective view of a Fresnel plate for use in the device for changing the width and direction of light of this invention.

FIG. 1 shows one example of a Fresnel plate used in the light width and direction changing device of this invention. This Fresnel plate 2 is constituted by a light-transmitting material such as, for example, glass or a synthetic resin, and, on one surface thereof (the upper surface in the figure), countless ridges 4 of triangular cross section having sloped faces 3 are disposed in parallel arrangement. These ridges 4 are ridges of minute dimensions of an order such that, visually, they can be hardly recognized, whereby the upper surface of the Fresnel plate 2 appears to the human eye as a flat smooth surface. The other face 5 of each ridge 4, in this example, is formed as a surface perpendicular to the plane of the Fresnel plate 2. The lower surface 6 of the Fresnel plate 2 in this example is a flat surface.

Figure 2:
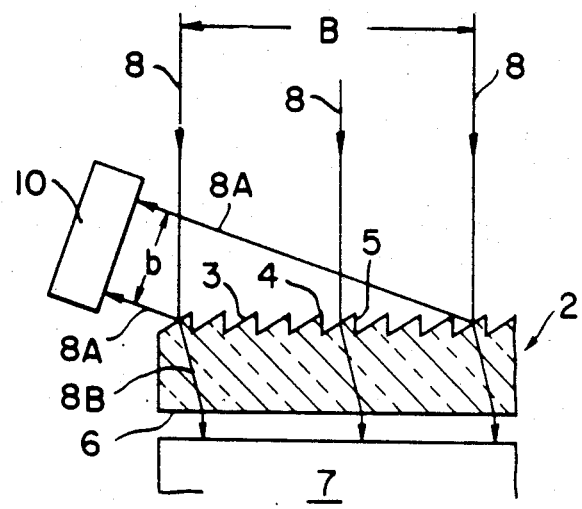
FIG. 2 is a view showing one example of use of a light width and direction changing device having the Fresnel plate of FIG. 1 for the purpose of collecting energy of light.

The Fresnel plate 2 described above can be used for changing the width and direction of light in a mode as shown in FIG. 2, for example. In the same figure, a device 7 for collecting energy of light 7 such as a heat collector is provided behind the Fresnel plate 2, and ridges 4 on the front face of the Fresnel plate 2 are adapted to receive sunlight rays 8, for example. The sunlight rays 8 are caused to impinge on the front face of the Fresnel plate 2 preferably perpendicularly or from right obliquely above. The sunlight rays 8 projected onto the sloped faces 3 of the ridges 4 are parallel light rays, and one portion thereof is reflected by the sloped faces 3 and is directed in the direction indicated by the arrow marks 8A. The reflected light rays 8A will become parallel light rays if the angles of the sloped faces 3 are all made the same, and the width b of the rays from plate 2 will become smaller than the width B of the incident sunlight rays 8. Thus, together with a change in the direction of light, a change (contraction) of the width has also been effected. In the path of the reflected light rays 8A, a device 10 for collecting energy of light, such as a water heater, is provided, and the energy of the reflected light rays 8A is collected by this device 10. On one hand, sunlight rays 8B which have been transmitted through the Fresnel plate 2 reach the energy collecting device 7 and impart energy thereto.

By carrying out change of direction and width of light by means of the Fresnel plate 2 in this manner, the light reflected from the front face of the Fresnel plate 2 can be conducted outside of the path of the incident light rays, and, moreover, reducing its width thereby to increase its energy density, it can be caused to reach the energy collecting device 10. Thus, the energy collecting device 10, at a position avoiding the incident light rays 8, receives the front face reflected energy of the Fresnel plate 2 with a width b narrower than the width B of the incident light rays, and it becomes possible to recover substantially completely the energy of the front face reflected light with a small-size collecting device 10 excepting for a portion of the front face reflected light shielded off by the tip edges of the ridges.

If it is assumed that there are no ridges 4 having sloped faces 3, the incident light rays 8 would be totally reflected in the reverse direction at the front face of the Fresnel plate, and it would be impossible to recover the energy of the reflected light rays.

Figure 3:
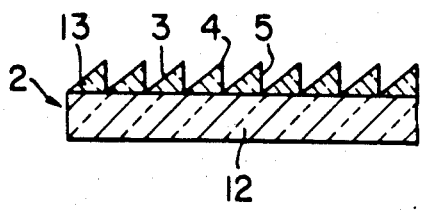
FIGS. 3 and 4 are sectional views respectively showing different modified examples of the Fresnel plate of FIG. 1.
Figure 4:
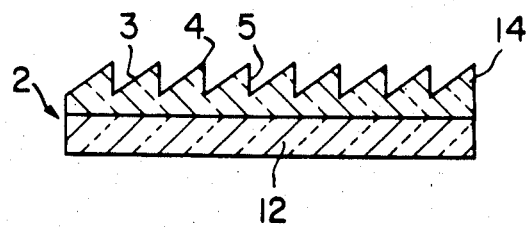

In the case when the Fresnel plate 2 is made of a synthetic resin, it can be formed as a flat plate of, for example, a silicone resin, a vinyl chloride resin, an acryl resin, or the like. On the other hand, the Fresnel plate 2 can be obtained by bonding a large number of transparent triangular bar structures 13 contiguously on one surface of a transparent flat plate 12 as shown in FIG. 3, or, as shown in FIG. 4, on a transparent flat plate 12, another flat plate 14 with a large number of ridges 4 formed beforehand thereon can be bonded thereby to obtain the Fresnel plate.

Figure 5:
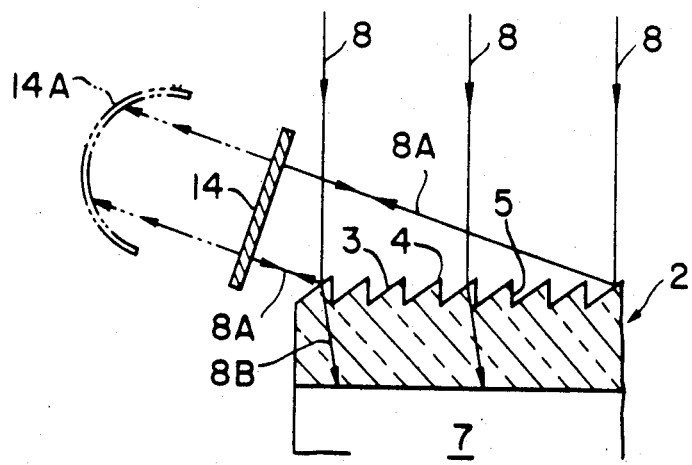
FIG. 5 through FIG. 7 are sectional views respectively showing different examples of the light width and direction changing device used for the purpose of collecting energy of light.

In the example shown in FIG. 2, the energy collecting device 7 is provided behind the Fresnel plate 2 with a space left therebetween, but the energy collecting device 7 can also be provided in contact with the back face of the Fresnel plate 2 as shown in FIG. 5; further, it is also possible to form the front face of the energy collecting device 7 itself with a Fresnel plate 2. Still furthermore, in the case where it is difficult to position the energy collecting device 7 behind the Fresnel plate 2, the device may be adapted to collect energy of light with only the energy collecting device 10 by making the Fresnel plate 2 of a nonlight-transmissive material and causing all of the light to be reflected at the sloped faces 3.

In the example shown in FIG. 5, a reflecting mirror 14 is provided in the path of the reflected light rays 8A, and the reflected light 8A reflected at the sloped faces 3 is reflected by the reflecting mirror and, tracing the same path, returns to the sloped faces 3. By this, the energy of the reflected light 8A is returned to the sloped faces 3, and the energy is transmitted through the Fresnel plate 2 to be absorbed with good efficiency in the energy collecting device 7. It is to be noted that, in the example of FIG. 5, the reflecting mirror 14 is constituted by a planar mirror, but, as indicated by chain lines in FIG. 5, a concave reflecting mirror 14A may be used, and also, instead of a concave reflecting mirror, a Fresnel mirror having an equivalent functional capacity may be used.

Figure 6:
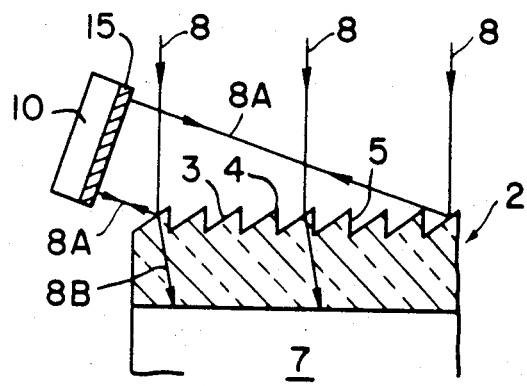

The example of practice shown in FIG. 6 is one in which, in the example shown in FIG. 2, a half mirror 15 is provided at the front face of the energy collecting device 10. The half mirror used here is not limited to one whose transmittance is 50%, and one of any desired transmittance can be used. In this example, one portion of the reflected light 8A is reflected by the half mirror 15, returned to the Fresnel plate 2, and sent to the main energy collecting device 7, while, on the other hand, the reflected light 8A which has been transmitted through the half mirror 15 is absorbed into the auxiliary energy collecting device 10. Accordingly, it can be said that the half mirror 15 has the function of determining the ratio between the reflected light to be returned to the main energy collecting device 7 and the reflected light to be sent to the auxiliary energy collecting device 10.

Figure 7:
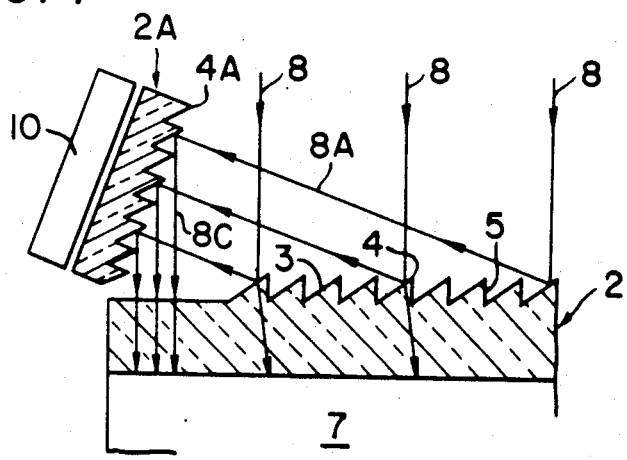

In the example shown in FIG. 7, a Fresnel plate 2A having ridges 4A similar to the Fresnel plate 2 is provided across the path of the reflected light rays 8A, and behind it a device 10 for collecting energy of light is provided. When, as in the examples of FIG. 5 and FIG. 6, the reflected light rays 8A are again returned through the same path to the Fresnel plate 2, there are cases wherein, even though one portion of the returned light infiltrates into the interior of the Fresnel plate 2, it follows a path in which it does not infiltrate directly toward the energy collecting device 7. In the example of FIG. 7, in order to avoid such a situation, the ridges 4A are provided on the Fresnel plate 2A, and light rays 8C reflected by the sloped faces of these ridges 4A are projected substantially perpendicularly onto a surface of the Fresnel plate 2 on which there are no ridges 4 and, being transmitted through the Fresnel plate 2, reach the energy collecting device 7. Thus, the reflected light 8A is effectively utilized. The energy of the light 8A transmitted through the Fresnel plate 2A is collected in the energy collecting device 10 therebehind. In this connection, an arrangement wherein, by providing ridges having suitable sloped faces also on the part with no ridges on the upper surface of the left end part of the Fresnel plate of FIG. 7 and causing reflected light to repeat mutual reflection between these ridges and the ridges 4A of the Fresnel plate 2A, the surface reflected light can ultimately be absorbed in either may be adapted. In this arrangement, if the sloped face angles of the ridges of both sides are caused to vary, a greater effectiveness can be obtained.

Figure 8:
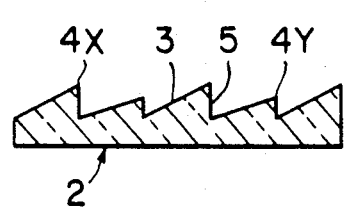
FIG. 8 is a sectional view showing a modified example of the Fresnel plate.

In the above described examples, the Fresnel plates 2 and 2A have ridges 4 of the same height and the same slope angle, but the ridges of the Fresnel plate 2, as shown in FIG. 8, can be made to be ridges 4X in which the slope angle is large and the height is large and ridges 4Y in which the slope angle is small and the height is low.

Figure 9:
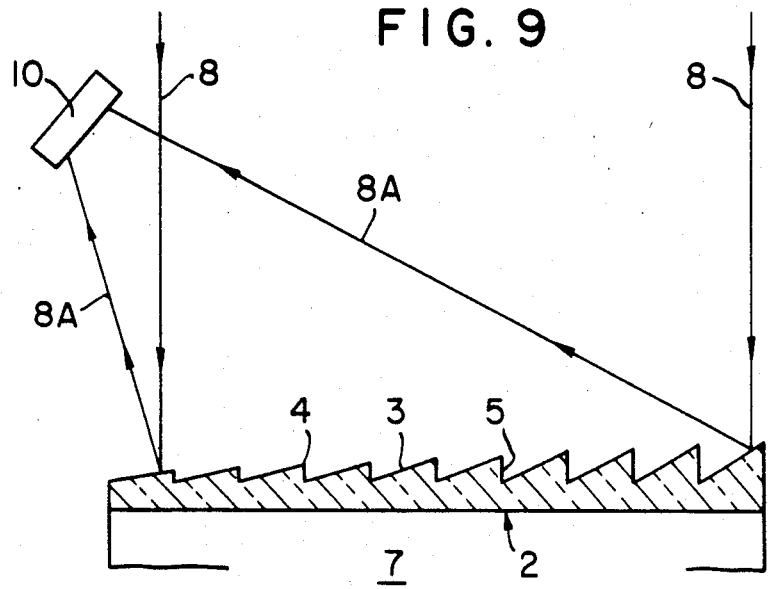
FIG. 9 is a view showing one example of a light width and direction changing device in which is used another modified example of the Fresnel plate.

Furthermore, as shown in FIG. 9, the ridges 4 of the Fresnel plate may be so constituted that, from one side of the Fresnel plate toward the other side, their height progressively increases, and the angle of their sloped faces also increases. By so doing, the reflected light 8A becomes convergent toward the energy collecting device 10, whereby the energy collecting device 10 can be made to have a much smaller size than that in the case of the aforedescribed examples, and the energy density of the light rays can be made high. It is to be noted that, also in the case where a reflecting mirror, half mirror, or the like is provided as in the aforedescribed examples in the position of the energy collecting device 10, small sized ones can be similarly used therefor.

Figure 10:
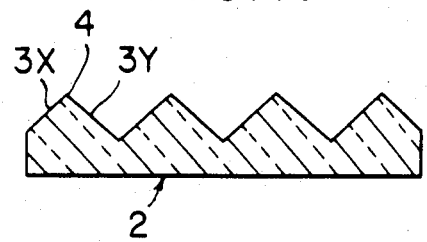
FIGS. 10 and 11 are sectional views respectively showing still other modified examples of the Fresnel plate.

In the example shown in FIG. 10, the ridges 4 of the Fresnel plate 2 have sloped faces 3X and 3Y of different sloping directions on opposite sides of their center planes in their longitudinal directions. In the case where sunlight rays are received by means of the Fresnel plate 2, the direction thereof is not always constant, and the irradiation angle thereof varies with variation of time. Even in such a case, irrespective of the direction of the sunlight rays, the light rays can be effectively utilized by a pair of sloped faces. In this connection, such a shape of the ridge 4 is convenient for preventing the phenomenon wherein a portion of the reflected light is shielded by the crest edge of the ridge.

Figure 11:
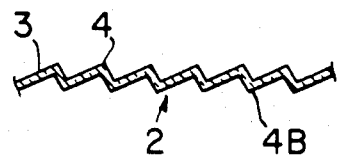

The Fresnel plate 2 can also be formed to have, not a shape having the ridges on only one face thereof, but corresponding ridges also on the other face thereof. One example of this is as shown in FIG. 11, in which, in addition to ridges 4 on one face, ridges 4B are formed also on the face on the opposite side. Such a Fresnel plate 2 can be produced by applying press forming to a thin sheet of a synthetic resin or cellophane.

Figure 12:
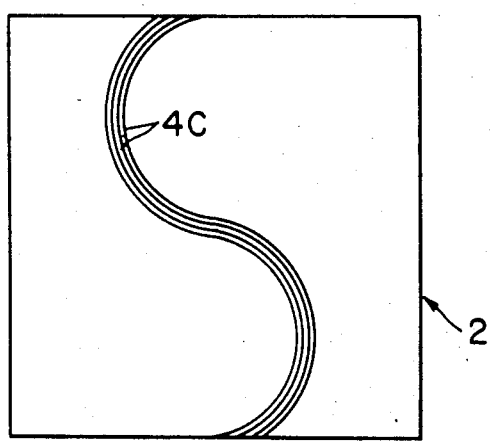
FIG. 12 is a plan view of a Fresnel plate having ridges of curved shape.
Figure 13:
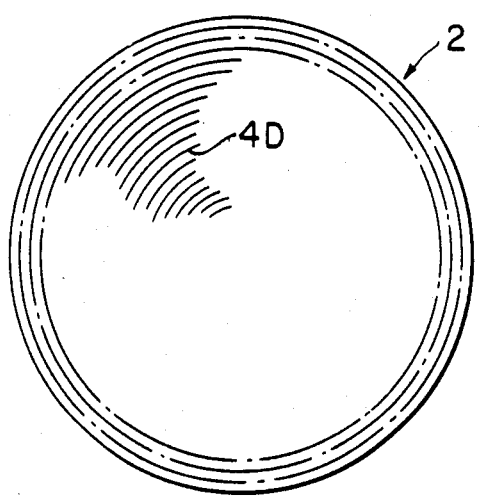
FIG. 13 is a plan view of a Fresnel plate having ridges of circular shape.
Figure 14:
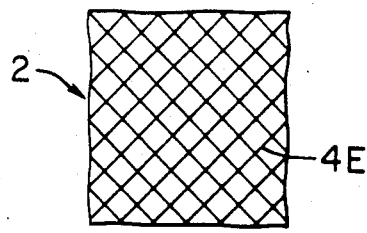
FIG. 14 is a plan view of a Fresnel plate having ridges of orthogonal arrangement.
Figure 15:
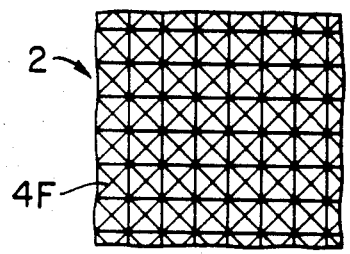
FIG. 15 is a plan view of a Fresnel plate having ridges intersecting to form angles of 45°.

In the examples described above, the ridges of the Fresnel plates are straight-line in shape, but ridges may have curved shapes as shown by 4C in FIG. 12 and also may be of circular shape as shown by 4D in FIG. 13. Furthermore, as shown in FIG. 14, ridges 4E of straight-line shape intersecting to mutually form right angles may be provided, and, as shown by 4F in FIG. 15, the ridges may be made to intersect at angles of 45°. In the examples of FIG. 12 and FIG. 13, by making the face with the ridges a reflecting face, a mirror for producing a distorted reflected image is obtained, and, by constructing the entire structure of a transparent material, a distorted light image can be sent out for a light image projected onto the face with the ridges. Furthermore, in the examples of FIG. 8, FIG. 14, FIG. 15, and others, the light image sent out by reflection or transmission appears superimposed.

The device of this invention for changing the width and direction of light, in addition to the uses described above can be used also for conducting sunlight rays into the interior of houses and the like.

Figure 16:
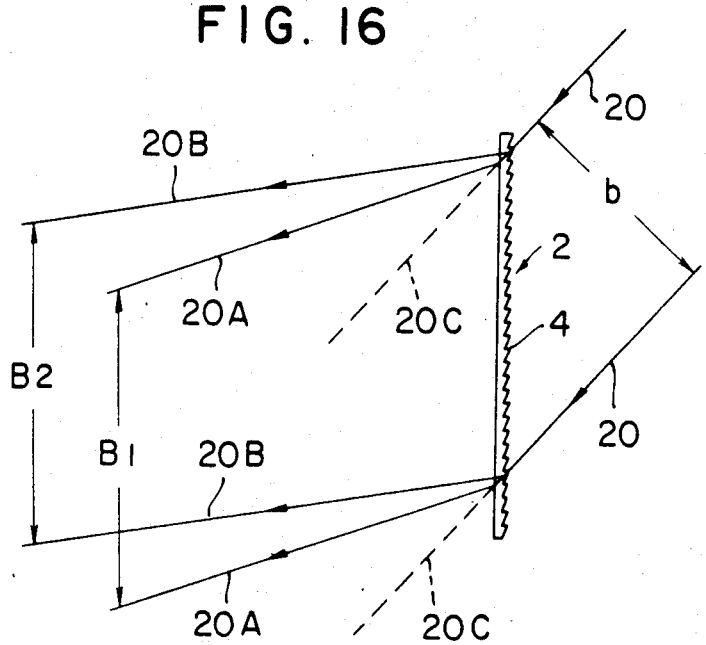
FIG. 16 is an explanatory view of a case wherein a Fresnel plate is used for conducting sunlight into a house.

It will now be supposed that a Fresnel plate 2 with ridges 4 of a constitution as shown in FIG. 1 is placed in the vertical direction as shown in FIG. 16, and sunlight rays 20 are projected onto the Fresnel plate 2 from, for example, the side with the ridges 4. In this case, as is apparent from the description relative to FIG. 2, etc., the light which has been transmitted through the Fresnel plate 2 is converted into a transmitted light beam 20A of width B1. Again, depending on the angle of the sloped faces of the ridges 4, it is converted into, for example, a transmitted light beam 20B of width B2. In either of these light beams, the width B1 or B2 has become greater than the width b of the incident sunlight rays 20. However, in the case where a simple transparent plate is placed in the position of the Fresnel plate 2, the sunlight rays 20 merely advance in a straight line without being converted in direction or width, as indicated at 20C.

Figure 17:
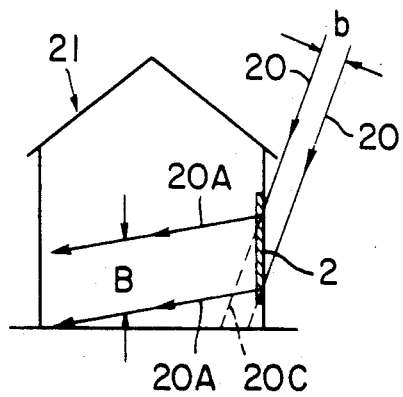
FIG. 17 is an explanatory view indicating the relationships between a Fresnel plate, a house, and sunlight which has been conducted.
Figure 18:
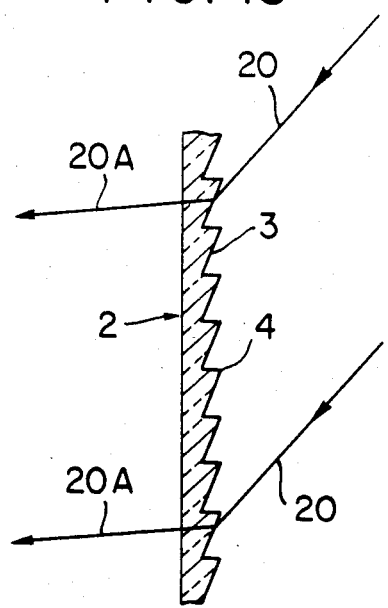
FIG. 18 is an enlarged vertical sectional view of a Fresnel plate.
Figure 19:
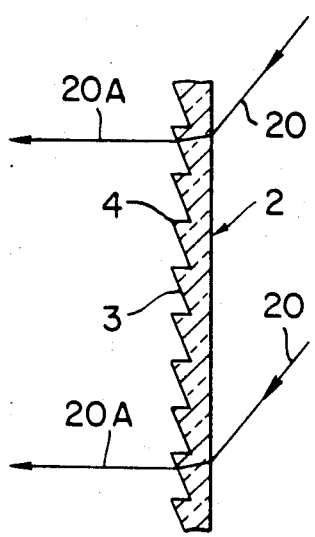
FIG. 19 is an enlarged vertical sectional view of a Fresnel plate in a different mode of use.

The principle indicated in FIG. 16 can be used for conducting sunlight into a house 21 as indicated in FIG. 17. If it is supposed that an ordinary glass plate is used in a window of the house 21, the sunlight 20 will merely enter as incident light in the window region of the room within the house as indicated at 20C, but if a Fresnel plate 2 in which the principle of this invention is used is installed with its face with the ridges 4 facing out of the house in the window as shown in FIG. 18, the sunlight 20 will be converted into a light beam 20A and will be sent, with a width B greater than the width b of the incident light rays, deep into the house 21. It should be mentioned that even when the Fresnel plate 2 is installed with its face with the ridges 4 facing toward the house interior, a similar effect is obtained as shown in FIG. 19. In either case, the sunlight can be conducted with any desired angle into the room by selecting the angle of the sloped faces 3 of the ridges.

Figure 20:
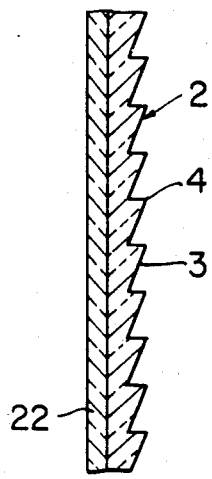
FIG. 20 is an enlarged vertical sectional view showing one example of a composite structure of a Fresnel plate and a glass plate.

While the Fresnel plate 2 itself may be fitted into a window sash frame in place of a glass pane, the Fresnel plate 2 may be made beforehand of a transparent plate such as, for example, silicone rubber, and bonding it to a glass plate 22 as shown in FIG. 20.

Figure 21:
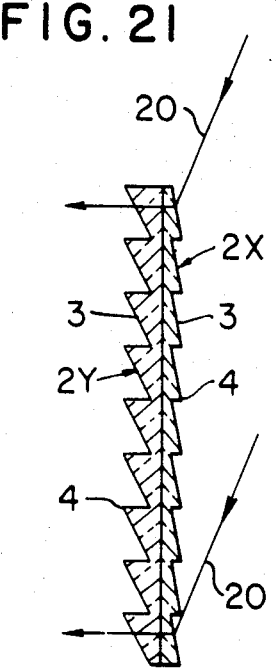
FIG. 21 is an enlarged vertical sectional view showing a composite structure of two Fresnel plates.

The plate structure shown in FIG. 21 is constituted by bonding together back-to-back two plates, Fresnel plates 2X and 2Y, with their ridges 4 faced toward their outer sides. By this example, also, the introduction of sunlight into a house can be carried out even more effectively.

Figure 22:
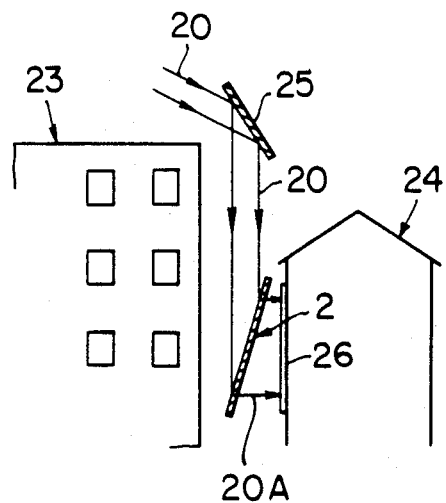
FIG. 22 through FIG. 24 are explanatory views respectively showing different examples of methods of conducting sunlight into houses.

FIG. 22 illustrates an example in which a Fresnel plate is used to introduce sunlight into a low building 24 in the shadow of a high building 23. In this example, a reflecting mirror 25 is provided behind the building 23 at a position higher than the building 23, and the reflected light from the reflecting mirror 25 is caused to be transmitted through a Fresnel plate 2 similar to that described hereinbefore to spread its width and to introduce it into the interior of the building 24. Depending on the case, the transmitted light rays 20A may be conducted through a light diffusing plate 26 such as of a milky-white color and then into the building 24. By this, a diffused light, and not a direct light, can be obtained.

Figure 23:
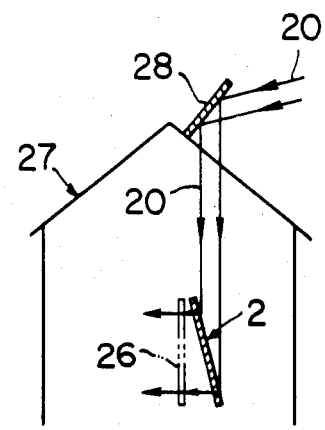

In the example of FIG. 23, a reflecting mirror 28 is provided on the roof of a house 27; sunlight is introduced into the house through an opening in the roof; and further, the width and the direction of the light rays are changed by a Fresnel plate 2 and introduced in horizontal direction into the house. Depending on the case, a light diffusing plate 26 can also be further provided.

Figure 24:
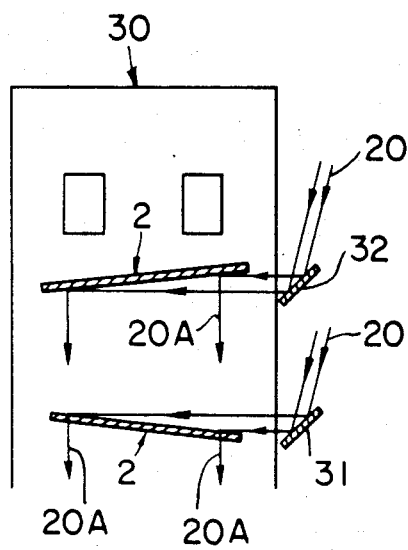

In the example of FIG. 24, after sunlight has been taken into a building in the horizontal direction with a reflecting mirror 31 outside of the building, it is converted into downwardly directed light rays 20A of widened width with a horizontally disposed Fresnel plate 2. In the same figure, light rays taken in horizontally into the building by a reflecting mirror 32 are converted into downwardly directed light rays 20A of increased width by reflection at the sloped faces of a Fresnel plate 2 with ridges on the basis of the principle of outer surface reflection indicated in FIG. 2, etc. In this case, the Fresnel plate 2 is used as an outer surface reflection type and not a transmitting type.

In the examples of FIG. 22 through FIG. 24, it is possible also, by using Fresnel plates 2 with ridges in place of the reflecting mirrors 25, 28, 31, and 32, to cause them to reflect sunlight.

In this connection, while the introduction of sunlight into houses is desirable, since a Fresnel plate 2 has a large number of prisms, as a result of sunlight being transmitted therethrough, color dispersion occurs.

Figure 25:
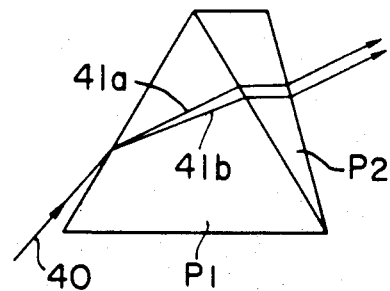
FIG. 25 is a diagrammatic view illustrating indicating the state wherein an auxiliary prism for preventing color dispersion is provided on a main prism.

In order to prevent such color dispersion, in principle, a structure wherein, along a main prism $P_1$, an auxiliary prism $P_2$ of a different dispersion rate is placed as shown in FIG. 25 can be adopted. In the case where an incident light ray 40 contains components of light of various wavelengths, color dispersion occurs on the light-exiting side of the main prism because of differences in the refractive indexes of these components. However, when the auxiliary prism $P_2$ is placed along the light-exiting side of the main prism $P_1$ in an inverted state relative to the main prism $P_1$, light rays dispersed as indicated at 41a and 41b are again collected within the auxiliary prism $P_2$, and color dispersion disappears.

Examples of application of the above principle to Fresnel plates 2 are shown in FIG. 26 through FIG. 29.

Figure 26:
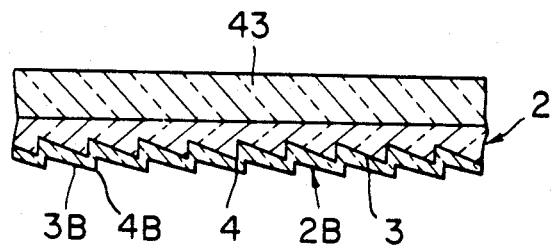
FIG. 26 through FIG. 29 are sectional views explanatory of various means applied to Fresnel plates for preventing color dispersion.

In the example of FIG. 26, the Fresnel plate 2 is bonded to a glass plate 43 similarly as in the case of FIG. 20, and, along the side with ridges 4, an auxiliary prism continuous structure 2B provided with ridges 4B having sloped faces 3B is placed.

Figure 27:
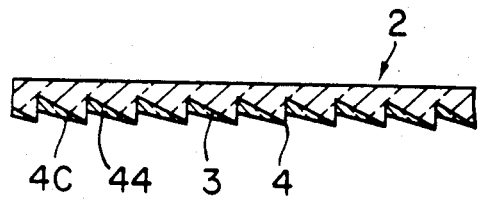

In the example of FIG. 27, along each of the sloped faces 3 of the ridges 4B of the Fresnel plate 2, an independent auxiliary prism 44 is provided. Each auxiliary prism 44 has a sloped face 4C.

The material of the Fresnel plate 2 having the main prisms and the dispersive power of the auxiliary prism continuous structure 2B or the auxiliary prism 44 are so determined as to be most suitable for nullifying in the latter the color dispersion arising in the former. As materials of the Fresnel plate 2, there can be used, for example, flint glasses (including plastic-based ones) of large content of silicic acid, potassium oxide, sodium oxide, calcium oxide, aluminum oxide, lead oxide, barium oxide, zinc oxide, boric acid, antimony oxide, arsenic oxide, and lead; and, as materials of the auxiliary prism, there are crown glasses (including plastic-based ones) such as borosilicate crown, barium crown, heavy barium crown, light flint, flint, heavy barium flint, heavy flint, and others.

Figure 28:
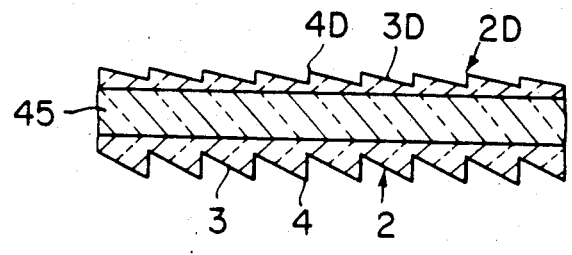

In the example shown in FIG. 28, on one surface of a glass plate 45, a Fresnel plate 2 with ridges 4 is bonded, and on the other surface, a Fresnel plate 2D with ridges 4D as auxiliary prisms is bonded, color dispersion in the fresnel plate 2 being canceled by the function of the Fresnel plate 2D.

Figure 29:
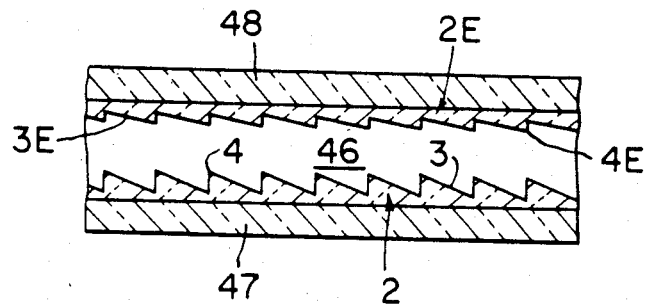

In the example of FIG. 29, two glass plate 47 and 48 are provided so as to constitute a double window plate with an gap 46 for heat insulation and soundproofing left therebetween, and along the inner surface of the glass plate 47, a Fresnel plate 2 with ridges 4 is bonded. Also, along the inner surface of the glass plate 48, a Fresnel plate 2E having ridges 4E with sloped faces 3E is bonded, and the ridges 4E carry out a color eliminating function as auxiliary prisms. Since each of these Fresnel plates 2 and 2E is a very thin sheet, it can be bonded without causing an increase in the width of the gap 46 and, moreover, causes an increase in the strength of the glass plate against fracture. In this example, there are the advantages of convenience in cleaning the window plate due to the absence of projections such as ridges on the outer sides of the window glass 47 and 48 and of little contamination of the window plate due to the fact that the ridges, on which dust and the like easily deposit, are in the sealed gap 46 between the two glass plates.

As described above, by using a Fresnel plate for conducting sunlight, sunlight can be sent with enlarged width into a room even under circumstances where sunlight does not infiltrate deeply into the room. Since the effectiveness of the Fresnel plates used in this invention can be readily obtained by using them directly as they are in place of already installed window glass or the like or by bonding them onto already installed window glass, it is possible to utilize them in a simple, uncomplicated manner. The angle of the sloped faces of the Fresnel plate is determined in view of the angle and direction of introduction of sunlight and the requirements of the scope of conduction of light into a room, and, depending on the circumstances, the installation place of a Fresnel plate can be only the upper half part or only the lower half part of a window.

The foregoing description has been made by taking evenly distributed sunlight as an example, but light to be processed with the Fresnel plate is not limited to sunlight. For example, the Fresnel plate can be used for the purpose of conversion of light rays containing an image. Furthermore, this Fresnel plate can be used as a blind for window glass or the like and used also for viewing something in a place which originally could not be seen.

INDUSTRIAL APPLICABILITY

A Fresnel plate used in this invention can carry out freely changing of width and direction of light in accordance with design, and, therefore, it can be applied for purposes such as sending reflected light in any desired direction and in a state of constricted width and carrying out collection of energy and sending light which has been transmitted through a Fresnel plate in any desired direction and in a state of expanded width and carrying out introducing of sunlight into a room. Thus, it is possible to use a Fresnel plate used in this invention as a reflection type or a transmission type. Furthermore, in this invention, a Fresnel plate can be used by forming it in a curved-surface shape.

I claim:

1. A device for changing the width and direction of light comprising:
   a transparent Fresnel plate having a surface with a plurality of minute parallel ridges having sloped faces, said Fresnel plate being positioned with said surface facing a light ray source for receiving incident light rays therefrom across a predetermined width of said plate in a direction transverse to said ridges, said sloped faces of said ridges being oriented in a direction and at an angle to the incident light rays for reflecting the light rays reaching said faces from the light ray source in a path of reflection which has a width transverse to said path which is smaller than said predetermined width and which is at an angle to the incident light rays;
   energy collecting means disposed in said path of reflection for receiving the reflected rays from said sloped faces and collecting the energy of the light rays; and
   a transparent second Fresnel plate disposed in said path of reflection between the sloped faces and said energy collecting means, said second Fresnel plate having ridges parallel with and facing said sloped faces.

2. A device for changing the width and direction of light comprising:
   a transparent Fresnel plate having a surface with a plurality of minute parallel ridges having sloped faces, said Fresnel plate being positioned with said surface facing a light ray source for receiving incident light rays therefrom across a predetermined width of said plate in a direction transverse to said ridges, said sloped faces of said ridges being oriented in a direction and at an angle to the incident light rays for reflecting the light rays reaching said faces from the light ray source in a path of reflection which has a width transverse to said path which is smaller than said predetermined width and which is at an angle to the incident light rays; energy collecting means disposed in said path of reflection for receiving the reflected rays from said sloped faces and collecting the energy of the light rays; and a further energy collecting means disposed on the side of said Fresnel plate opposite to said surface thereof.

* * * * *